United States Patent [19]

Parks

[11] Patent Number: 5,607,753
[45] Date of Patent: Mar. 4, 1997

[54] PLURALITY OF SEPARATED GLASS SHEETS

[75] Inventor: Rickey D. Parks, Wagoner, Okla.

[73] Assignee: Ford Motor Company, Dearborn, Mich.

[21] Appl. No.: 460,813

[22] Filed: Jun. 2, 1995

[51] Int. Cl.$^6$ ........................................ B32B 3/00
[52] U.S. Cl. .................. 428/210; 428/326; 428/426; 428/428; 427/154; 427/165; 427/180
[58] Field of Search ..................... 428/426, 326, 428/438, 432, 461, 34, 428, 210; 427/154, 165, 180

[56] References Cited

U.S. PATENT DOCUMENTS

| | | | |
|---|---|---|---|
| 4,011,359 | 3/1977 | Simpkin et al. | 428/326 |
| 4,302,263 | 11/1981 | Postupack | 156/100 |
| 4,353,466 | 10/1982 | Pater . | |
| 4,360,544 | 11/1982 | Frantz et al. | 427/165 |
| 4,447,496 | 5/1984 | Frantz et al. | 428/432 |
| 4,529,648 | 7/1985 | Duffer et al. | 428/326 |
| 4,568,605 | 2/1986 | Duffer et al. | 428/326 |
| 4,786,784 | 11/1988 | Nikodem et al. | 219/543 |
| 4,898,632 | 2/1990 | Roth et al. | 156/99 |
| 5,094,903 | 3/1992 | Elzey . | |
| 5,443,669 | 8/1995 | Tunker | 156/102 |

*Primary Examiner*—Merrick Dixon
*Attorney, Agent, or Firm*—Lorraine S. Melotik

[57] ABSTRACT

This invention is directed to a method for separating glass sheets in a stack by providing a coating of substantially parallel, spaced apart strips of a powdered separating agent on one of the broad surfaces of the sheet leaving uncoated regions of the glass between the strips. When these glass sheets are stacked together, the are arranged so that the coating is carried on only one of the two proximate surfaces of the glass sheets.

6 Claims, 1 Drawing Sheet

PLURALITY OF SEPARATED GLASS SHEETS

FIELD OF THE INVENTION

This invention is directed to a method of separating glass sheets in a glass stack by providing substantially parallel, spaced apart strips of a separating powder on one of the broad surfaces of the glass sheets which will be proximate to another glass sheet in the stack.

BACKGROUND OF THE INVENTION

In the process of fabricating windows for automotive vehicles, glass templates are first cut from glass sheets in a desired pattern. These templates are stacked in a container for shipping to a location where they will be processed further. Fabrication of the templates into automobile backlites, e.g., involves removing one template at a time from the container, placing it on a conveyor belt for travel through washing equipment, painting the outer portion with black paint and then shaping the painted template into a final form as by press or sag-bending. The first step, removing the template from the container and placing it on a conveyor belt, is generally handled by means of a robotics arm which has suction cups that attach to the template. Since these glass stacks generally contain multiple pieces of glass, it is critically important that these templates separate easily. Otherwise, instead of only one template being removed from the stack, a group of adherent templates would be lifted out together. Since the suction cups are not able to maintain suction of the group, they would end up as scrap on the floor.

Conventionally, in the glass making industry, to assure that the templates separate easily from each other, a layer of a powdered separating agent is provided over the entire surface of one of the broad template surfaces. One of the drawbacks of providing a coating on the entire glass template surface is that it obstructs the visibility of any defects present in the glass. The result is that glass of less than desirable quality may be inadvertently shipped. It may be that only after the additional investment of cost and time for fabrication is the less than desirable quality apparent. It would be commercially desirable to be able to determine, prior to shipping or processing, which templates are of less than desirable quality to prevent their shipment. The present invention overcomes such disadvantages. We have unexpectedly found that by providing a powdered separating agent in substantially parallel strips across a surface of the glass sheet, i.e., covering only a relatively small portion of the glass surface, easy separation of the glass sheets is attained while at the same time allowing viewing of the glass for defects. In addition to the invention advantages described above, the invention is effective in reducing glass manufacturing costs since substantially less separating powder is used as compared to the prior art separating processes which provide a coating over the entire surface of the glass sheet.

DISCLOSURE OF THE INVENTION

The invention is a plurality of glass sheets in a stack carrying a coating of a powdered separating agent in substantially parallel strips with uncoated portions therebetween on one broad surface of each sheet, the sheets being arranged in the stack so that the coating is carried on only one of the two broad surfaces proximate one another in the stack. According to another embodiment of the invention, it is a method of separating a plurality of glass sheets in a stack which comprises providing a coating of a powdered separating agent in substantially parallel strips with uncoated portions therebetween on one broad surface of each sheet. Most optimally, according to the invention, the strips cover less than 25% of the broad surface area of the glass and are provided in a thickness of about 1 to 2 mm.

DETAILED DESCRIPTION OF PREFERRED EMBODIMENTS

Figure 1:
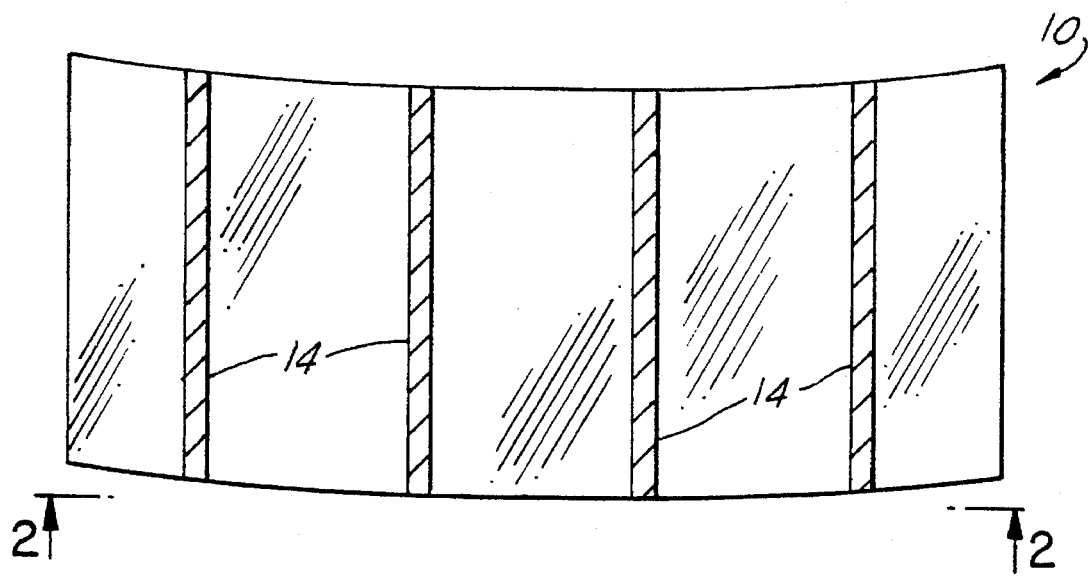
FIG. 1 is a schematic representation of a glass template carrying strips of a powdered separating agent according to an embodiment of the present invention.

This invention is readily understood by reference to the Figures. A glass sheet in the shape of template 12 is shown carrying a coating of four strips 14 of a powdered separating agent in FIG. 1. The strips are substantially parallel across one broad surface of the template. By broad surface is meant one of the two larger surfaces of a glass template. While the glass sheet shown in FIG. 1 is shaped for backlite application, the glass sheets according to the present invention may be of any shape, and be flat or curved. While templates are used for discussion purposes in this disclosure, the invention is not meant to be so limited.

Figure 2:
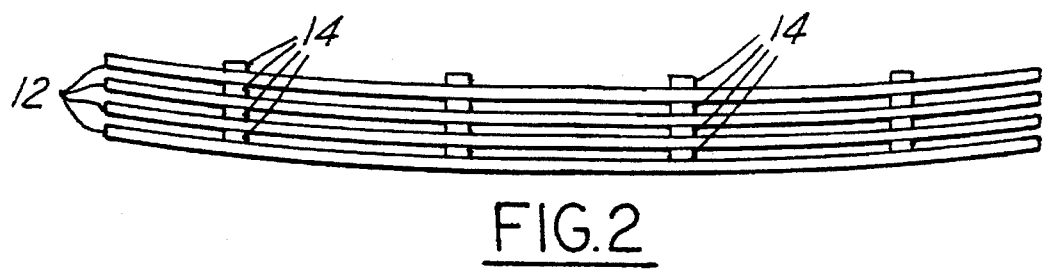
FIG. 2 is a side view of a stack of glass templates carrying strips of a powdered separating agent according to an embodiment of the present invention.

The substantially parallel strips (lines) of powdered separating agent traverse from one edge of the glass template to another edge of the glass template, one embodiment being shown in FIG. 1. As shown in FIG. 1, the strips are provided on only one of the broad surfaces of the glass template. According to the invention, a plurality of templates so coated with strips of agent will be arranged in the stack so that the coating 14' is carried on only one of the two broad faces of the glass templates 12' proximate one another in the stack as shown in side view in FIG. 2.

The powdered separating agent strips are spaced apart so that they do not coat the entire area of the broad surface as shown in FIG. 1. The number of optimal stripes, spacing from one another, position on the broad surface, and the individual width of the strips will vary with the particular size and configuration of the broad surface of the glass template, as would be apparent to one skilled in the art in view of the present disclosure. For example, a larger template will benefit from wider strips or more strips or both as compared to a smaller template in order to provide adequate separating qualities to glass templates in a stack. The strips used on a template generally would be of the same widths and equally spaced apart, but this is not required according to the invention. While the strips are shown positioned vertically on the template, they could be positioned horizontally or at an angle, i.e., diagonally, if desired. According to the invention, it has been found that generally the powdered separating agent need only be provided as a coating in the striped configuration to cover less than about 50 percent of the broad surface area (12 of FIG. 1) of the glass template in order to provide such stacked, coated glass templates with excellent separating qualities. More particularly, this coated area is preferably less than about 25 percent, and more preferably between about 6 and 12 percent of the broad surface area of the glass sheet on which they are carried. In a glass template configuration shown in FIG. 1, having dimensions approximately 65 by 27 inches, four strips each about 1 inch wide and separated by about 10 inches (of uncoated glass) were provided across the surface of the glass template in a thickness (depth to the glass) of about 1 to 2 mm. Using such a stripe pattern provided excellent separation of the glass templates in a stack with like coated templates, arranged with such a "stripe coated" surface proximate a non-coated surface. As compared to prior art "entire surface" coating techniques which provided visibility of none of the glass surface for defect inspection, the present invention particular embodiment described above provided visibility of at least 89% of the glass surface.

The strips of powdered separating agent may be applied in any thickness on the glass surface. Effective separation of glass sheets according to the present invention was facilitated with strips even as thin as 2 mm–0.1 mm thick. Preferably, in use with automotive glazings, the thickness would be between about 1.5 mm and 0.5 mm thick, most preferably being about 1 mm thick. The optimal thickness for a glass sheet in a stack will be apparent to one skilled in the art in view of the present disclosure. Numerous powdered separating agents for glass sheets are available and known to those in the glass industry. Exemplary of one such agent is LucorÔ, e.g., Lucor Ô LA-50 available from Syde Line Corp, in Grosse Isle, Mich. 48138.

Figure 3:
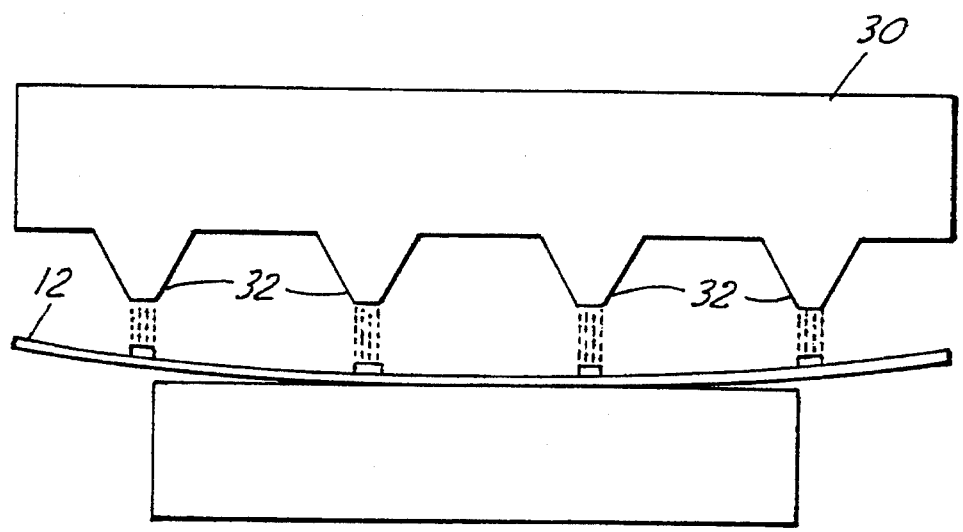
FIG. 3 is a schematic representation of a funnel apparatus for providing the powdered separating agent on glass surfaces according to an embodiment of the present invention.

The strips of powdered separating agent may be provided onto the surface of the glass template by any acceptable means. One commercially convenient means involves dispensing the powder through spaced apart slits 30 in a funnel type dispensing apparatus 32 as shown in FIG. 3 as the glass sheets move under the dispensing apparatus on a conveyor belt. As would be apparent, this particular dispensing apparatus is meant to provide four strips of powdered material on the glass template as it passes under the apparatus. The configuration of the apparatus funnel may be modified, as would be apparent to one skilled in the art in view of the present disclosure, to distribute other numbers of powder strips. Optimally, the powder is desposited in such density that it obstructs clear viewing of the glass in the area covered by the stripes.

Such strips of powdered separating agent adhere sufficiently well to the glass templates after application to allow the glass to be handled and stacked into containers without substantial disturbance of the powder strips. Some dusting off of the powder is acceptable during handling and does not impact the practice of the present invention. The powder adheres well to the glass during transportation of the stack but is easily removed by washing or other cleaning methods prior to further fabrication or use of the glass sheets. The invention is not to be limited to the details disclosed above but may be modified within the scope of the claims.

I claim:

1. A plurality of glass sheets in a stack carrying a coating of a powdered separating agent in substantially parallel strips with uncoated portions therebetween on one broad surface of each sheet, the sheets being arranged in the stack so that the coating is carried on only one of the two broad surfaces proximate one another in the stack.

2. The plurality of glass sheets according to claim 1 wherein said strips cover less than 50 percent of the broad surface area of said sheet on which they are carried.

3. The plurality of glass sheets according to claim 2, wherein said strips cover less than 25 percent of the broad surface area of said sheet on which they are carried.

4. The plurality of glass sheet according to claim 3, wherein said strips cover an area between about 12 and 6 percent of the broad surface area of said sheet on which they are carried.

5. The plurality of glass sheets according to claim 1 wherein the thickness of said powdered separating agent is about 1 to 2 mm.

6. The plurality of glass sheets according to claim 1 wherein said powdered separating agent is LucorÔ.

\* \* \* \* \*